United States Patent [19]
Song

[11] Patent Number: 5,982,615
[45] Date of Patent: Nov. 9, 1999

[54] PORTABLE COMPUTER HAVING A HEAT-EMITTING DEVICE MOUNTABLE ON A CPU FOR EMITTING HEAT GENERATED FROM THE CPU VIA AIR VENTILATION HOLES FORMED ON A KEYBOARD

[75] Inventor: Kwang-Ho Song, Seoul, Rep. of Korea

[73] Assignee: SamSung Electronics Co., Ltd., Suwon, Rep. of Korea

[21] Appl. No.: 08/814,656

[22] Filed: Mar. 11, 1997

[30] Foreign Application Priority Data

Mar. 13, 1996 [KR] Rep. of Korea ..................... 96/6641

[51] Int. Cl.$^6$ ................................. G06F 1/20; H05K 7/20
[52] U.S. Cl. ........................... 361/687; 361/690; 361/700
[58] Field of Search ..................... 364/708.1; 361/680, 361/687, 699, 700, 704, 705, 707, 690

[56] References Cited

U.S. PATENT DOCUMENTS

| | | |
|---|---|---|
| 5,313,362 | 5/1994 | Hatada . |
| 5,331,510 | 7/1994 | Ouchi . |
| 5,409,352 | 4/1995 | Lin . |
| 5,423,375 | 6/1995 | Chiou . |
| 5,430,609 | 7/1995 | Kikinis ................................. 361/687 |
| 5,461,540 | 10/1995 | Lee . |
| 5,473,508 | 12/1995 | Porter . |
| 5,526,875 | 6/1996 | Lin . |
| 5,557,500 | 9/1996 | Baucom et al. . |
| 5,559,675 | 9/1996 | Hsieh et al. ........................... 361/707 |
| 5,568,360 | 10/1996 | Penniman et al. ..................... 361/687 |
| 5,583,746 | 12/1996 | Wang . |

*Primary Examiner*—Lynn D. Feild
*Attorney, Agent, or Firm*—Robert E. Bushell, Esq.

[57] ABSTRACT

A portable computer having a heat-emitting device and includes a CPU board; a CPU mounted on the CPU board; a first heat emitting member directly mounted on a top surface of the CPU for emitting heat generated from the CPU; a second heat emitting member having a large surface area for dissipating the heat emitted from the first heat emitting member by heat conduction; a top board having a first plurality of perforated apertures, positioned on the second heat emitting member for passing the heat dissipated from the second heat emitting member to the outside of the portable computer; a key frame having a second, complementary to the first, plurality of perforated apertures, positioned on the top board for passing the heat passed through the top board to the outside of the portable computer; and a keypad supported by the key frame and having a third, complementary to the first and second, plurality of perforated apertures for passing the heat passed through the key frame to the outside of the portable computer. As a result, the heat generated from the CPU which is used to circulate in the interior of the portable computer is now efficiently emitted to the outside of the portable computer through air ventilation holes of a keyboard or a heat emitting plate connected thereto.

20 Claims, 4 Drawing Sheets

PORTABLE COMPUTER HAVING A HEAT-EMITTING DEVICE MOUNTABLE ON A CPU FOR EMITTING HEAT GENERATED FROM THE CPU VIA AIR VENTILATION HOLES FORMED ON A KEYBOARD

CLAIM OF PRIORITY

This application makes reference to, incorporates the same herein, and claims all benefits accruing under 35 U.S.C. §119 from an application entitled A PORTABLE COMPUTER HAVING A HEAT-EMITTING DEVICE earlier filed in the Korean Industrial Property Office on 1996, and there duly assigned Ser. No. 96-6641 by that Office.

BACKGROUND OF THE INVENTION

1. Technical Field

The present invention relates to a computer system having a heat emitting device, more particularly, to a portable computer having a heat emitting device incorporated therein for emitting heat generated by a central processing unit (CPU) to outside of the portable computer through air ventilation holes formed on a keyboard.

2. Related Art

Generally, when a computer system is in use and its central processing unit (CPU) is in operation, heat will be released which results in a relatively high temperature rise (e.g., 95° C. to 130° C.). Such a high temperature rise typically disables operation of the computer system. Therefore, it is necessary to install cooling devices for quickly removing heat generated during the operation of the computer CPU. For conventional desktop computers, an add-in card type cooling fan is generally installed to effectively transfer heat from the computer CPU to the outside of the computer enclosure. For most portable computers such as laptops and notebooks, where there is a very limited interior space to accommodate such a fan and there is limited power supply from battery sets to support operation of such a fan, however, a heat dissipating device in a form of heat sink, namely a block or plate made of high heat conductivity material is generally installed in the computer enclosure to dissipate the heat generated from the computer CPU.

Conventional heat dissipating devices for portable computers which come in many different designs, are disclosed, for example, in U.S. Pat. No. 5,583,746 for Heat Sink Assembly For A Central Processing Unit Of A Computer issued to Wang, U.S. Pat. No. 5,559,675 for Computer CPU Heat Dissipating And Protecting Device issued to Hsieh et al., U. S. Pat. No. 5,557,500 for Heat Dissipating Arrangement In A Portable Computer, U.S. Pat. No. 5,526,875 for Cooling Device For CPU issued to Lin, U.S. Pat. No. 5,473,508 for Focused CPU Air Cooling System Including High Efficiency Heat Exchanger issued to Porter, U.S. Pat. No. 5,461,540 for Heat Dissipating Device For Personal Computers issued to Lee, U.S. Pat. No. 5,430,609 for Microprocessor Cooling In A Portable Computer issued to Kikinis, U.S. Pat. No. 5,423,375 for CPU Heat Sink Mounting Structure issued to Chiou, U.S. Pat. No. 5,409,352 for CPU Heat Dissipating Device issued to Lin, U.S. Pat. No. 5,331,510 for Electronic Equipment And Computer With Heat Pipe issued to Ouchi, and U.S. Pat. No. 5,313,362 for Packaging Structure Of Small Size Computer issued to Hatada. Generally, the heat dissipating device has a heat emitting plate mounted on the computer CPU in order to transfer the heat generated by the CPU to the outside of the computer enclosure by means of heat conduction.

Recent improvements in the compactness and computer speed of portable computers have, however, rendered many of the conventional heat dissipating designs ineffective because most heat emitting plates cannot fully protect the computer CPU from a greater amount of heat generated by the high performance and high-speed CPU. As a result, many portable computers today may still suffer the occasional disruption from the heat generated from the computer CPU that has not been sufficiently dissipated in the interior environment of the computer enclosure. Further, it has also been my observation that many conventional heat dissipating designs do not effectively transfer the heat generated from the computer CPU to the outside of the computer enclosure. That is, in many conventional heat dissipating designs, the heat dissipated by the heat emitting plate still remains within the computer enclosure and cannot be transferred to the outside of the computer enclosure. Accordingly, further improvements in the heat emitting devices for portable computers can still be contemplated.

SUMMARY OF THE INVENTION

It is therefore an object of the present invention to provide an improved heat emitting device for portable computers.

It is also an object to provide a heat emitting device mounted on a CPU of a portable computer for effectively and efficiently emitting heat generated from the computer CPU to the outside of the computer enclosure through air ventilation holes formed on a keyboard of the portable computer.

These and other objects of the present invention can be achieved by a computer system which includes a CPU board; a CPU mounted on the CPU board; a first heat emitting member directly mounted on a top surface of the CPU for emitting heat generated from the CPU; a second heat emitting member having a large surface area for dissipating the heat emitted from the first heat emitting member by heat conduction; a top board having a first plurality of perforated apertures, positioned on the second heat emitting member for passing the heat dissipated from the second heat emitting member to the outside of the portable computer; a key frame having a second, complementary to the first, plurality of perforated apertures, positioned on the top board for passing the heat passed through the top board to the outside of the portable computer; and a keypad supported by the key frame and having a third, complementary to the first and second, plurality of perforated apertures for passing the heat passed through the key frame to the outside of the portable computer.

The present invention is more specifically described in the following paragraphs by reference to the drawings attached only by way of example.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
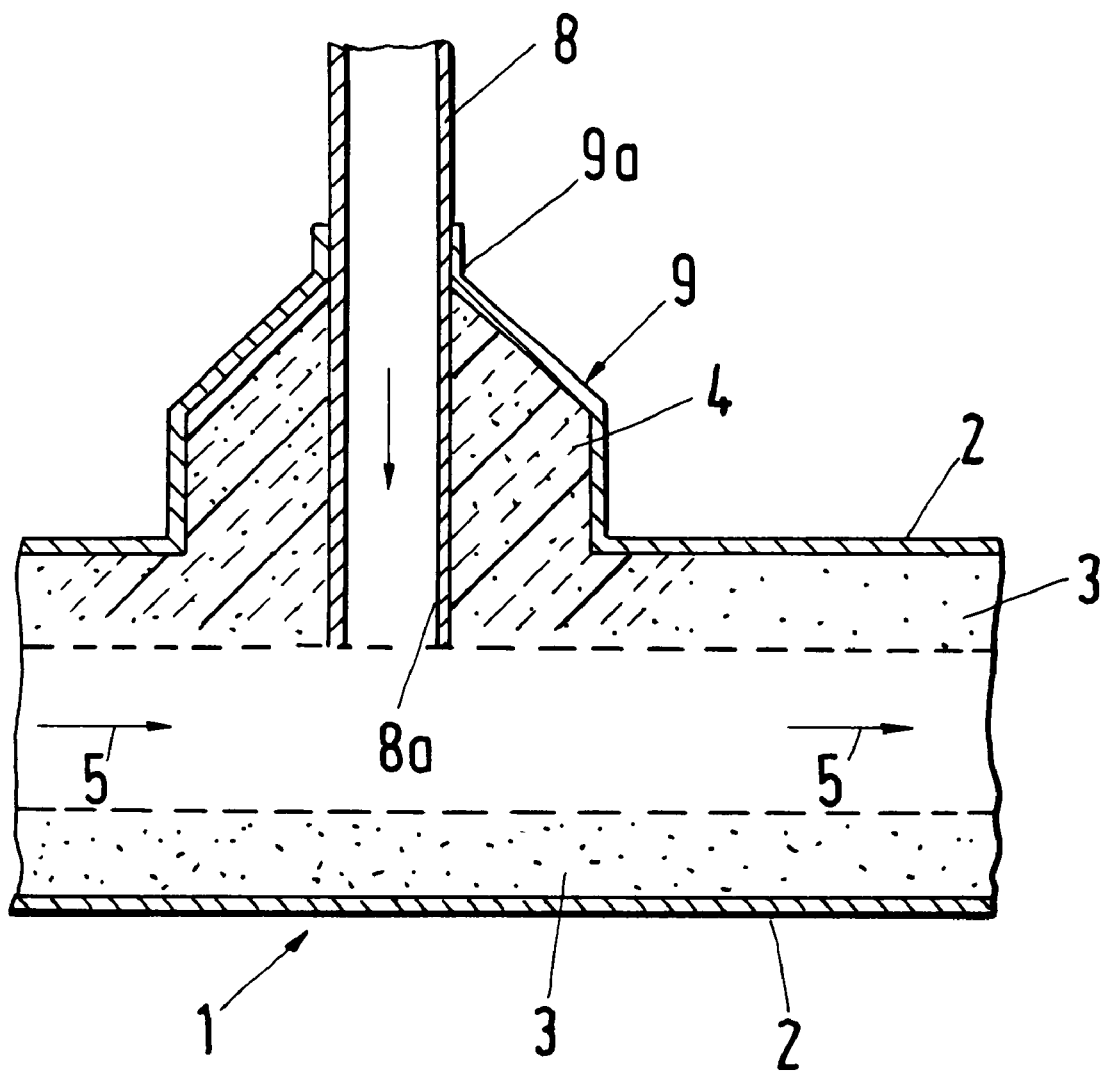
FIG. 1 is a partial sectional view of a portable computer having an exemplary heat emitting device incorporated therein.

Referring now to the drawings and particularly to FIG. 1, which illustrates a portable computer having an exemplary heat emitting device incorporated therein. As shown in FIG. 1, the portable computer 30 includes a central processing unit 10 and the exemplary heat emitting device 20 for superimposing the CPU in order to transfer and emit heat generated from the CPU 10 into the interior environment of a computer enclosure. As generally discussed, the CPU 10 which controls all data processing and peripheral device operation of the portable computer, generates more heat than the other devices in the portable computer. The heat emitting plate is directly mounted on the CPU in order to transfer and emit heat generated from the CPU to the interior air of the computer enclosure. The CPU generally emits heat to the air, but not all of the heat generated is emitted because of the limited contact area between the CPU and air. Therefore, by mounting the heat emitting plate on the CPU, the heat is emitted more smoothly via a greater contacting area between the heat emitting plate and air. Creases can be formed on the heat emitting plate in order to increase the contact area.

As the portable computer such as a laptop and notebook becomes more compactness and its computer speed is substantially enhanced, however, many of the exemplary heat emitting designs are not effective in dissipating all the heat generated from the CPU due to a greater amount of heat generated by the high performance and high-speed CPU. Consequently, I have observed that many portable computers may still suffer the occasional disruption from the heat generated from the computer CPU that has not been sufficiently dissipated in the interior environment of the computer enclosure. Moreover, I have also observed that many available heat dissipating designs do not effectively transfer the heat generated from the computer CPU to the outside of the computer enclosure. That is, in many conventional heat dissipating designs, the heat dissipated by the heat emitting plate will still stay within the computer enclosure and cannot be transferred to the outside of the computer enclosure.

Figure 2:
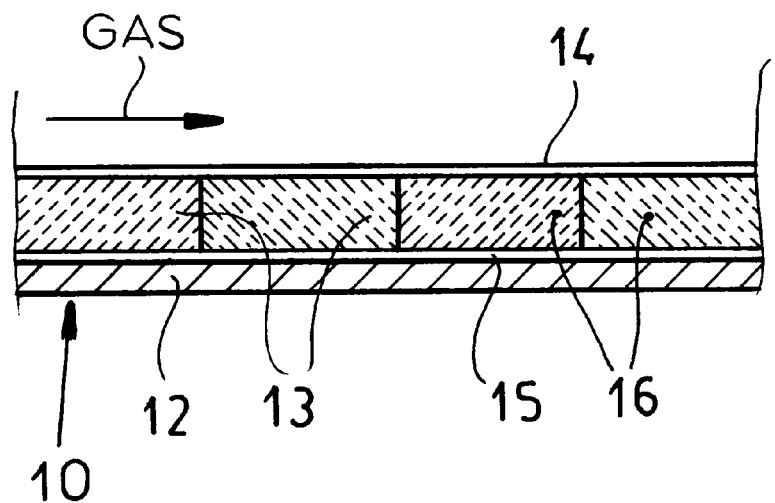
FIG. 2 is an exploded perspective view of a portable computer having a heat emitting device constructed according to the principles of the present invention.

Referring now to FIG. 2, which is an exploded perspective view of a portable computer having a heat emitting device constructed according to the principles of the present invention. The portable computer includes a central processing unit (CPU) board 140 and a central processing unit (CPU) 150 mounted on the central processing unit board 140. A successive lamination of heat emitting means 400, 500 and 600 is constructed in order to fully emit the heat generated from the CPU 150. A first heat emitting member 400 is directly mounted on the CPU 150 to emit the heat generated from the CPU 150. A second heat emitting member 500 is installed to transfer the heat from the first heat-emitting member 400 by heat conduction. A top board 70 is positioned on the second heat-emitting member 500 to separate a keyboard portion and internal circuits of the portable computer. The top board 70 has a plurality of air ventilation holes for passing the heat generated from the computer CPU 150 to the outside of the computer enclosure. A key frame 60 is positioned on the top board 70 and includes a complementary set of air ventilation holes for passing the heat generated from the computer CPU 150 through the top board 70. A keypad 50 is supported by the key frame 60 and includes a plurality of discrete keys that are independently operable by manual depression to provide to the computer CPU 150 a plurality of unique input signals representing a plurality of different control functions. The key pad 50 also has air ventilation holes for passing the heat generated from the computer CPU 150 to the outside of the computer enclosure.

Accordingly to an embodiment of this invention, the first heat emitting member 400 of the portable computer includes a heat emitting plate 130 which is mounted in direct contact with the CPU 150 mounted on the CPU board 140 and made of high conductivity material such as aluminum (Al) or aluminum alloy for absorbing and emitting the heat generated from the CPU 150, a heating emitting pipe 110 which is extended from the heat emitting plate 130 for transmitting the heat absorbed from the heat emitting plate 130, and a fixing plate 120 which is made of high conductive material such as aluminum (Al) or aluminum alloy for fixing the heat emitting pipe 110 to the heat emitting plate 130.

The second heat emitting member 500 has a large surface area for dissipating the heat generated from the CPU 150 which has absorbed through the first heat emitting member 400. The second heat emitting member 500 includes a heat emitting pipe holder 90 which is also made of materials of high conductivity for supporting the heat emitting pipe 110, and a bracket board 80 which is connected to the heat-emitting pipe holder 90 for emitting the heat absorbed from the first heat emitting member 400 to the outside of the portable computer.

The third heat emitting member 600 which is mounted in direct contact with a bottom side of the CPU board 140 for emitting the heat generated from the CPU 150, includes a heat emitting plate 230 for absorbing the heat generated from the CPU 150 from the bottom side of the CPU board 140, a heat emitting pipe 210 which is extended from the heat emitting plate 230 for transmitting the heat absorbed from the heat emitting plate 230, and a fixing plate 220 which is made of high conductive material such as aluminum (Al) or aluminum alloy for fixing the heat emitting pipe 210 to the heat emitting plate 230. A rear bracket 250 can also be connected to the third heat emitting member 600 for emitting the heat generated from the CPU 150 through a rear side of the portable computer. A CPU door 240 made of plastics is positioned to support and cover the third heat emitting member 600 and includes a plurality of air ventilation holes for passing the heat generated from the CPU 150 to the outside via the bottom side of the portable computer.

Figure 3:
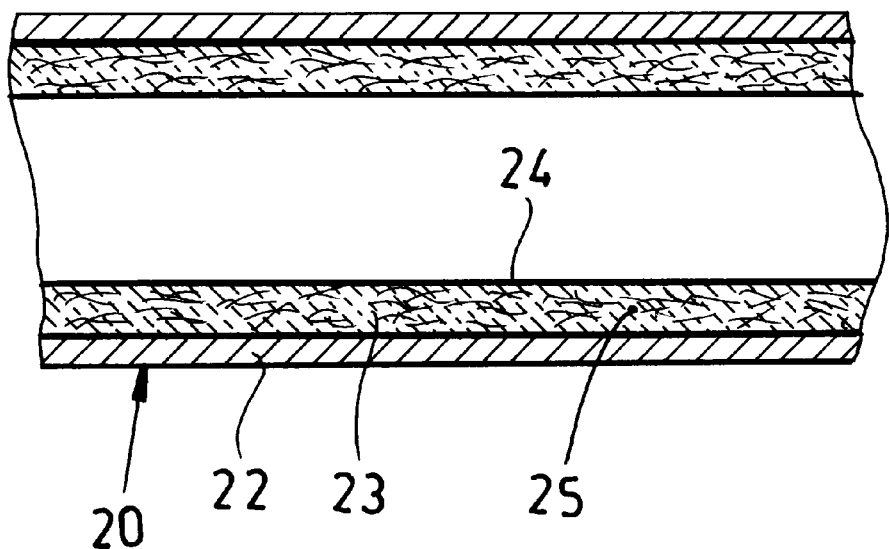
FIG. 3 is a cross-sectional view of a portable computer having the heat-emitting device as shown in FIG. 2 incorporated therein.

FIG. 3 illustrates the portable computer having the heat emitting device when all components are fully assembled according to the principles of the present invention. The pipe holder 90 serves to secure the heating emitting pipes 110 and 210 of the first and third heat emitting members 400 and 600. The top board 70 which is mounted on the bracket board 80 of the second heat emitting member 500 and has a plurality of air ventilation holes for transferring the heat generated from the CPU 150 as absorbed through the first and second heat emitting members 400 and 500 to the outside of the keypad 60. Similarly, the CPU door 240 which is detachable from the bottom of the computer enclosure 260 and has a plurality of air ventilation holes for transferring the heat generated from the CPU 150 absorbed through the third heat emitting member 600 to the outside of the computer enclosure 260. Optionally, the rear bracket 250 (not shown in FIG. 3) may be mounted on the side of the third heat emitting member 600 for emitting the heat generated from the CPU 150 through the rear side of the computer enclosure 260.

In operation, the CPU 150 is mounted on the CPU board 140 in connection with various circuits in the portable computer in order to control operation of the portable computer, and the heat-emitting plate 130 primarily emits heat from the CPU 150 by directly dissipating the heat generated from the CPU 150.

Figure 4:
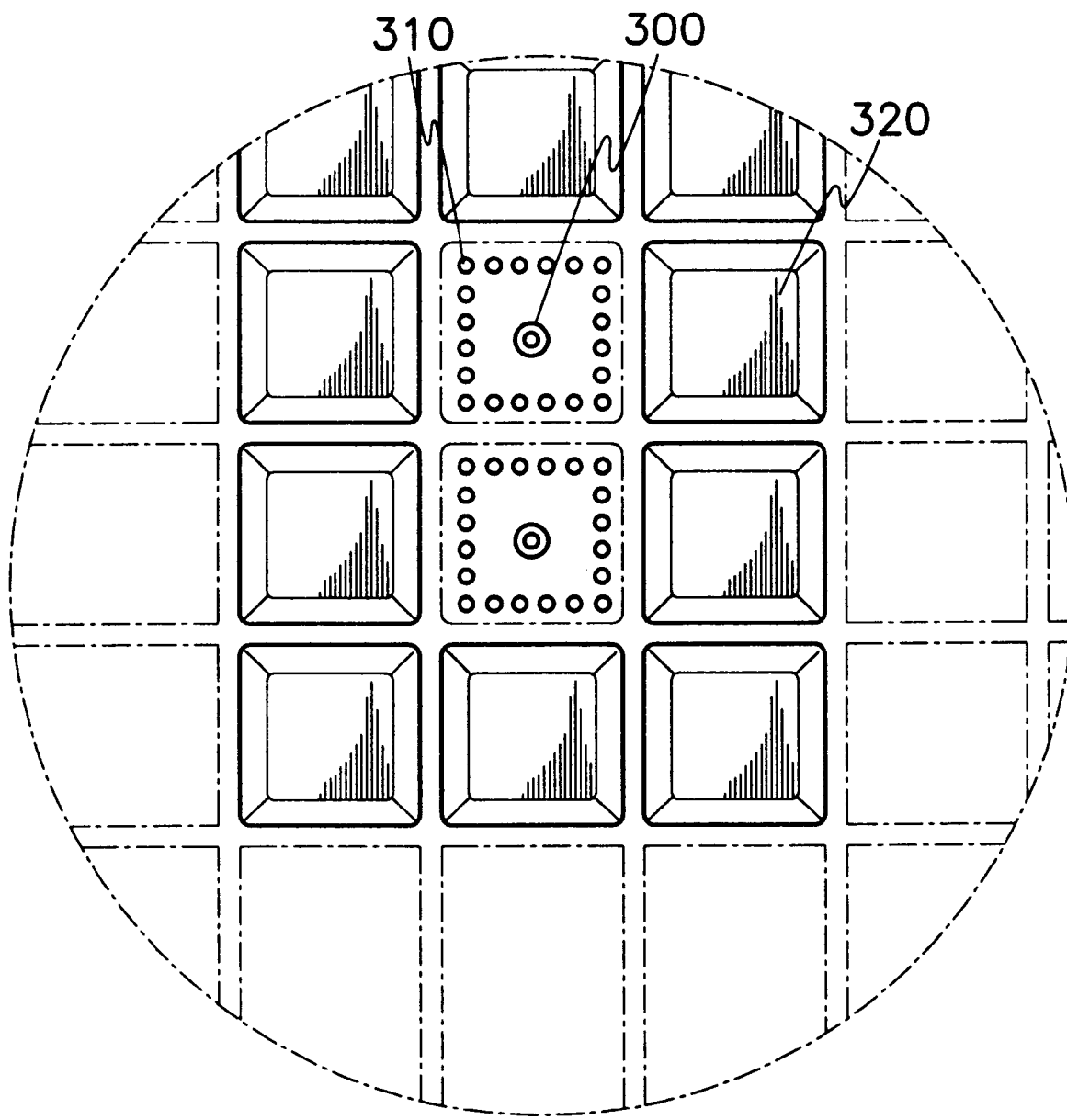
FIG. 4 is an expanded view of a key cap and a keyboard of the portable computer.

The heat emitting pipe 110 is fixed to the heat emitting plate 130 by the fixing plate 120 so as to distribute the heat absorbed from the heat emitting plate 130 into the heat emitting pipe holder 90, where the heat is transmitted to the bracket board 80 by heat conduction. The transmitted heat from the bracket board 80 is emitted through air ventilation holes formed on the top board 70, and is also emitted through air ventilation holes of the key frame 60. Then, the heat is finally emitted to the outside of the portable computer through air ventilation holes 310 perforated around a mounting receptacle 300 where each key cap 320 of the keypad 50 is mounted. FIG. 4 is an expanded view of the key cap 320 of the keypad of the portable computer.

Again, the portable computer constructed according to the present invention may also include a rear bracket 250 which is connected to the third heat emitting member 600 for emitting heat generated from the CPU 150 to the rear side of the portable computer. The CPU door 240 also includes a plurality of perforated holes formed thereon for allowing the air to flow into and the heat absorbed from the third heat emitting member 600 to flow to the outside of the personal computer.

Figure 5:
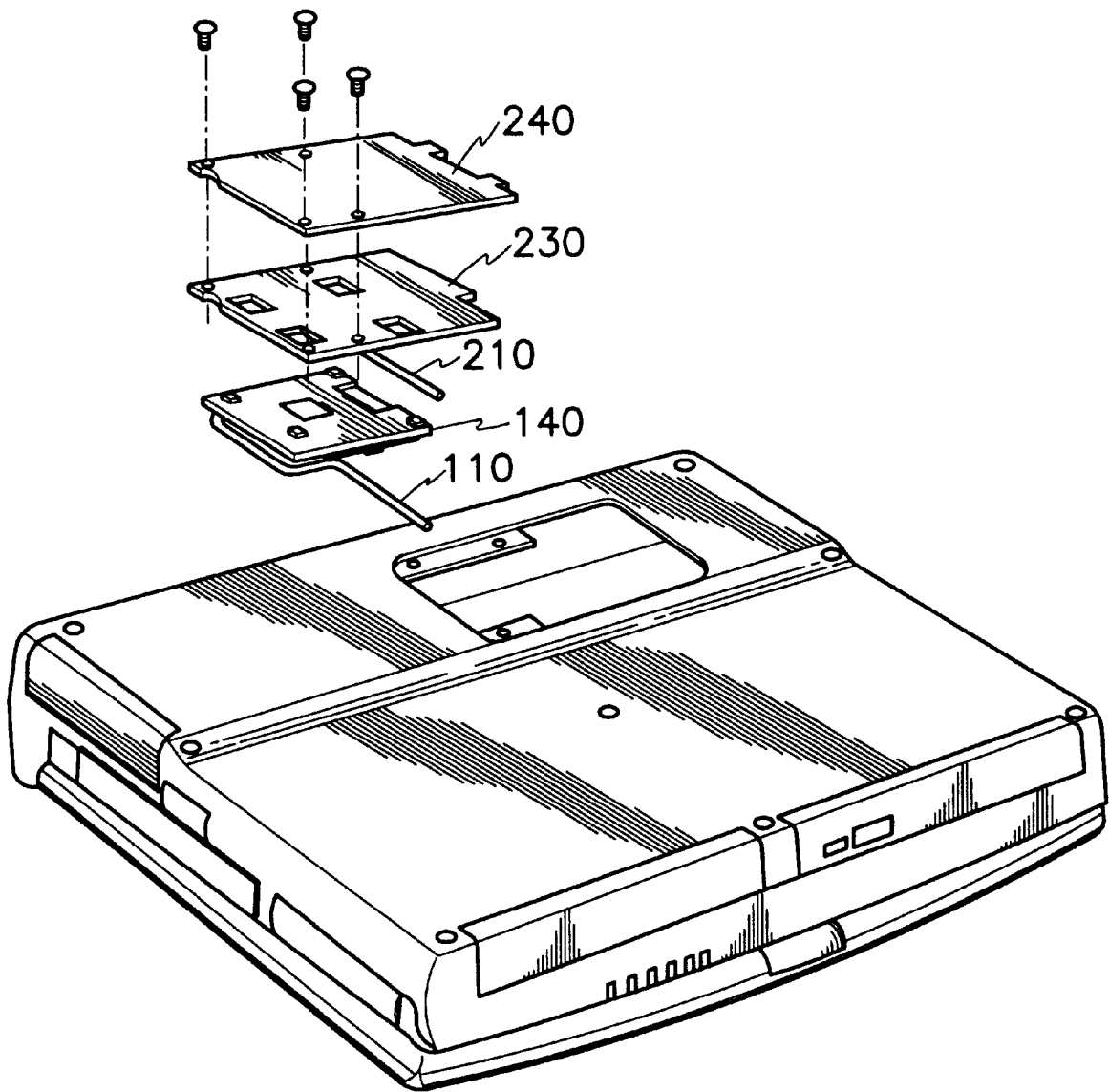
FIG. 5 is a perspective view of an installation of the CPU into the portable computer according to the principles of the present invention.

Refer now to FIG. 5, which is a perspective view of an installation of the CPU 150 into the portable computer according to the principles of the present invention. The user can exchange the CPU 150 attached to the CPU board 140 for an upgrade by simply removing the CPU door 240, the third heat emitting member 600 containing thereon a heat emitting plate 230 and a heat emitting pipe 210, and the CPU board 140 containing thereon the CPU 150.

As apparent from the above description, the heat generated from the CPU which is used to circulate in the interior of the portable computer is now efficiently emitted to the outside of the portable computer through air ventilation holes of a keyboard or a heat emitting plate connected thereto. The heat emitting device constructed according to the principles of the present invention can be applied to a heat sink field for all portable computers.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

What is claimed is:

1. A portable computer, comprising:
    a central processing unit board;
    a central processing unit mounted on said central processing unit board;
    a first heat emitting member directly mounted on a top surface of said central processing unit for emitting heat generated from said central processing unit;
    a second heat emitting member disposed over said first heat emitting member, and having a large surface area for dissipating the heat emitted from said first heat emitting member by heat conduction;
    a top board having a first plurality of perforated apertures, positioned on said second heat emitting member for passing the heat dissipated from said second heat emitting member to the outside of the portable computer;
    a key frame having a second, complementary to said first, plurality of perforated apertures, positioned on said top board for passing the heat passed through the top board to the outside of the portable computer; and
    a keypad supported by said key frame and having a third, complementary to said first and second, plurality of perforated apertures for passing the heat passed through the key frame to the outside of the portable computer.

2. The portable computer of claim 1, further comprised of said first heat emitting member comprising:
    a heat emitting plate directly mounted on said central processing unit and made of materials of high conductivity for emitting the heat generated from said central processing unit;
    a heat emitting pipe connected to said heat emitting plate for transmitting the heat emitted from said heat emitting plate; and
    a second plate made of materials of high conductivity attaching said heat emitting pipe to said heat emitting plate.

3. The portable computer of claim 2, further comprised of said second heat emitting member comprising:
    a heat emitting pipe holder which is made of materials of high conductivity for supporting said heat emitting pipe of the first heat emitting member; and
    a bracket board having a large surface area connected to said heat-emitting pipe holder for emitting the heat dissipated from the first heat emitting member to the outside of the portable computer.

4. The portable computer of claim 1, further comprising a third heat emitting member mounted directly on a bottom side of said central processing unit board for emitting the heat generated from said central processing unit.

5. The portable computer of claim 4, further comprising a rear bracket connected to said third heat emitting member for emitting the heat generated from said central processing unit through a rear side of the portable computer.

6. The portable computer of claim 4, further comprising a central processing unit door which is made of plastics and has a plurality of air ventilation holes and which covers said third heat emitting member for passing the heat generated from said central processing unit to the outside of the portable computer through said air ventilation holes.

7. A computer system, comprising:
    a computer enclosure having a detachable door having a plurality of air ventilation holes, for allowing access to a central processing unit mounted on a circuit board;
    a first heat emitting member directly mounted on a top surface of said central processing unit for emitting heat generated from said central processing unit;
    a second heat emitting member having a large surface area for dissipating the heat emitted from said first heat emitting member by heat conduction;
    a third heat emitting member directly mounted a bottom surface of the central processing unit circuit board, and positioned on said detachable door for emitting the heat generated from the central processing unit to the outside of the computer enclosure through said air ventilation holes of said detachable door; and
    a cover assembly containing a key frame having a plurality of perforated apertures, positioned on said second heat emitting member for passing the heat dissipated from said second heat emitting member to the outside of the computer enclosure through said perforated apertures.

8. The computer system of claim 7, further comprised of said first heat emitting member comprising:
   a heat emitting plate which is directly mounted on said central processing unit and made of materials of high conductivity for emitting the heat generated from said central processing unit;
   a heat emitting pipe which is connected to the heat emitting plate for transmitting the heat emitted from the heat emitting plate; and
   a second plate which is made of materials of high conductivity attaching said heat emitting pipe to said heat emitting plate.

9. The computer system of claim 8, further comprised of said second heat emitting member comprising:
   a heat emitting pipe holder which is made of materials of high conductivity for supporting said heat emitting pipe of the first heat emitting member; and
   a bracket board having a large surface area connected to said heat-emitting pipe holder for emitting the heat dissipated from the first heat emitting member to the outside of the computer enclosure.

10. The computer system of claim 9, further comprising a rear bracket connected to said third heat emitting member for emitting the heat generated from said central processing unit through a rear side of the computer enclosure.

11. The computer system of claim 7, further comprised of said detachable door made of plastics for covering said third heat emitting member for passing the heat generated from said central processing unit to the outside of the computer enclosure through said air ventilation holes.

12. A portable computer system, comprising:
   an enclosure containing a central processing unit
   a first heat emitting member directly mounted on a top surface of said central processing unit for emitting heat generated from said central processing unit;
   a second heat emitting member disposed over said first heat emitting member, and having a surface area greater than said first heat emitting member but less than said enclosure for dissipating the heat emitted from said first heat emitting member by heat conduction; and
   a key frame having a plurality of perforated apertures, positioned on said second heat emitting member for passing the heat dissipated from said second heat emitting member to the outside of said enclosure through said perforated apertures.

13. The portable computer system of claim 12, further comprised of said first heat emitting member comprising:
   a heat emitting plate which is directly mounted on said central processing unit and made of materials of high conductivity for emitting the heat generated from said central processing unit;
   a heat emitting pipe which is connected to said heat emitting plate for transmitting the heat emitted from said heat emitting plate; and
   a second plate which is made of materials of higb conductivity attaching said heat emitting pipe to said heat emitting plate.

14. The portable computer system of claim 13, further comprised of said second heat emitting member comprising:
   a heat emitting pipe holder which is made of materials of high conductivity for supporting said heat emitting pipe of the first heat emitting member; and
   a bracket board having a large surface area connected to said heat emitting pipe holder for emitting the heat dissipated from the first heat emitting member to the outside of the computer enclosure.

15. The portable computer system of claim 12, further comprising:
   a third heat emitting member mounted directly on a bottom side of a central processing unit board for emitting the heat generated from said central processing unit; and
   a central processing unit door which is made of plastics and has a plurality of air ventilation holes and which is detachable from the bottom of said enclosure so as to exchange said central processing unit by removing said third heat emitting member.

16. The portable computer system of claim 15, further comprising a rear bracket connected to said third heat emitting member for emitting the heat generated from said central processing unit to the outside of the portable computer through a rear side of the portable computer.

17. A computer system, comprising:
   a computer enclosure having a central processing unit mounted on a circuit board;
   a first heat emitting member mounted on a top surface of said central processing unit for emitting heat generated from said central processing unit;
   a second heat emitting member disposed over said first heat emitting heat member, and having a surface area extended to a perimeter of the computer enclosure for dissipating the heat emitted from said first heat emitting member by heat conduction;
   a third heat emitting member mounted a bottom surface of the circuit board, for emitting the heat generated from said central processing unit to the outside of the computer enclosure; and
   a key frame positioned on said second heat emitting member, and comprising a plurality of individual key caps with each key cap having a plurality of perforated apertures for passing the heat dissipated from said second heat emitting member to the outside of the computer enclosure through said perforated apertures.

18. The computer system of claim 17, further comprised of said first heat emitting member comprising:
   a heat emitting plate directly mounted on said central processing unit and made of materials of high conductivity for emitting the heat of generated from said central processing unit;
   a heat emitting pipe connected to said heat emitting plate for transmitting the heat emitted from said heat emitting plate; and
   a second plate made of materials of high conductivity attaching said heat emitting pipe to said heat emitting plate.

19. The computer system of claim 17, further comprised of said second heat emitting member comprising:
   a heat emitting pipe holder made of materials of high conductivity for supporting said heat emitting pipe of said first heat emitting member; and
   a bracket board connected to said heat-emitting pipe holder, and having a surface area extended to the perimeter of the computer enclosure, for emitting the heat dissipated from said first heat emitting member to the outside of the computer enclosure.

20. The computer system of claim 19, further comprising a rear bracket connected to said third heat emitting member for emitting the heat generated from said central processing unit through a rear side of the computer enclosure.

* * * * *